3,388,647
OBJECTIVE LENS MOUNT
Kinpei Yajima, Tokyo-to, Japan, assignor to Asahi Kogaku Kogyo Kabushiki Kaisha, Tokyo-to, Japan
Filed July 1, 1966, Ser. No. 562,265
Claims priority, application Japan, Aug. 11, 1965, 40/65,480
9 Claims. (Cl. 95—11)

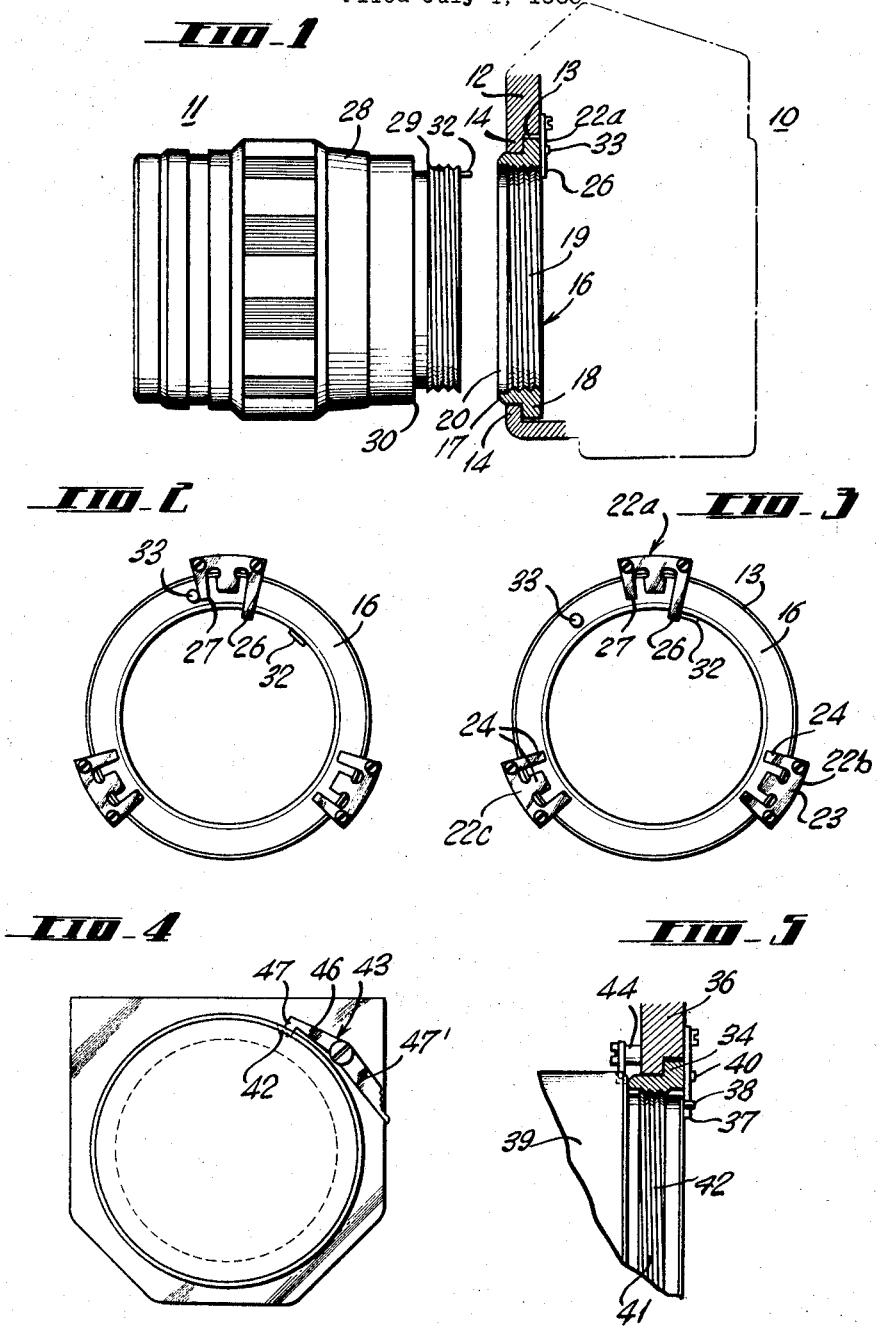

The present invention relates generally to improvements in photographic cameras and it relates more particularly to an improved interchangeable objective lens mount or coupling.

Interchangeable objectives are conventionally separably mounted to the body of the camera by either a threaded coupling or a bayonet coupling arrangement. While the use of a threaded coupling possesses numerous advantages in that it effects a secure mounting and is easy and inexpensive to accurately produce, it possesses many disadvantages particularly when employed with a coupled automatic diaphragm or an exposure meter. In the mounting of an objective of the threaded coupling type the objective barrel is very frequently screwed either too tightly or not tightly enough which effects an undesirable variation in the distance between the objective lens and the focal plane and various cooperating components of the camera. On the other hand, while the objective barrel with a bayonet mounting may be easily and rapidly mounted, an accurate coupling is expensive to produce to close tolerance and a secure and rigid coupling is difficult to achieve. Thus, the conventional interchangeable objective mounts represents a compromise, each possessing advantages and drawbacks.

It is therefore a principal object of the present invention to provide an improved photographic camera of the interchangeable objective lens type.

Another object of the present invention is to provide an improved camera interchangeable objective mounting mechanism.

Still another object of the present invention is to provide an improved screw type mounting for interchangeable objectives which possesses the advantages of the conventional screw type mounting and none of the disadvantages thereof.

A further object of the present invention is to provide an objective lens mounting of the above nature characterized by its reliability, ease of use, accuracy and low cost.

The above and other objects of the present invention will become apparent from a reading of the following description taken in conjunction with the accompanying drawing, wherein:

FIGURE 1 is an elevational view, partially in section, of a camera and objective lens provided with a mounting mechanism embodying the present invention, the objective and camera body being shown in a disengaged condition;

FIGURE 2 is a rear view of the coupling section illustrating the objective during the mounting operation;

FIGURE 3 is a view similar to FIGURE 1, the objective being shown in a fully mounted condition;

FIGURE 4 is a front elevational view of another form of objective mounting mechanism embodying the present invention and shown in a fully coupled condition; and FIGURE 5 is a fragmentary enlarged longitudinal sectional view thereof.

In a sense the present invention contemplates the provision of a photographic camera, comprising a camera body member, a coupling ring rotatably mounted on said body member and provided with a peripheral thread, means inhibiting the rotation of said coupling ring and releasable at a preselected torque on said coupling ring, a lens barrel provided with a peripheral thread matably engageable with said coupling ring thread, and releasably engageable indexing means positioned on said body member and lens barrel. According to a preferred form of the improved camera the coupling ring registers with a circular opening in the camera body, the rear face of the ring being engaged by spring fingers which retard the rotation of the ring. The indexing means comprises an inwardly directed abutment element positioned on the body member rearwardly of the coupling ring and a stop element directed rearwardly from the barrel wall. Additionally, means are provided for limiting the amount of rotation of the coupling ring. In the alternative, the indexing means may include a recess formed in the barrel and a spring actuated detent carried by the body member. In the above arrangement, the tightness or degree of coupling between the barrel and the coupling ring is uniform and constant by reason of the clutch or slip type retardation of the rotation of the coupling ring which functions as a torque regulator. Further, a uniform and constant position of the objective barrel relative to the camera body is also achieved by reason of the indexing means.

Referring now to the drawing, and more particularly FIGURES 1 to 3 thereof which illustrate a preferred embodiment of the present invention, the reference numeral 10 generally designates a camera body member or casing which is provided with an interchangeable objective lens 11. The camera body member 10 includes a front wall 12 having formed therein a circular opening 13 provided with an inwardly offset section at its front to define a peripheral lip or flange 14.

A coupling ring 16 rotatably engages the opening 13, and includes a front section 17 which projects through the opening delineated by the lip 14 and an enlarged rear section 18 which nests in the rear portion of the opening 13 and includes a front face or shoulder which bears on the corresponding rear face of the lip 14, and a rear face which is substantially coplanar with the rear face of the casing front wall 12. A coupling thread 19 is formed in the inner face of the ring 16 which is provided with a smooth lead bore 20.

Locking the coupling ring 16 in the opening 13 against axial movement, and retarding the rotation of the coupling ring 16, are a plurality of circumferentially spaced spring elements 22a, 22b and 22c. The spring elements 22a, 22b and 22c are of E-shaped configuration including a peripherally extending cross member 23 affixed by screws to the rear face of the front wall 12 along the border of the opening 13 and radially inwardly projecting legs 24 which are sprung forwardly with their free end sections in engagement with the rear face of the coupling ring 16. One of the legs 26 of the spring element 22a projects inwardly of the inner periphery of the coupling ring 16 to define a first abutment member and the opposite leg 27 thereof defines a second abutment member.

The objective 11 includes a barrel 28 provided with an externally threaded rear section 29 adapted to engage the ring thread 19 and a rearwardly facing shoulder 30 disposed forwardly of the threaded section 29. A stop element 32 is mounted on and projects rearwardly of the rear face of the wall of the threaded section 29. It should be noted that the torque required to screw the barrel section 29 into the threaded bore 19 of the coupling ring 16, is normally less than that required to rotate the coupling ring 16 against the retarding force of the spring elements 22a, 22b and 22c. However, the retarding pressure of the spring elements is such as to permit the rotation of the coupling ring 16 upon the torque imparted thereto by the rotating barrel 28 when a threaded engagement of optimum tightness is effected between the barrel 28 and the coupling ring 16. Moreover, the stop element 32 extends rearwardly from the barrel section 29 a distance as to be disposed in peripheral registry with the abutment member 26 only when the desired coupling is effected between the barrel and coupling ring and they rotate as a unit. A stop element 33 is mounted on and projects rearwardly of the coupling ring 16 and is positioned in peripheral alignment with the abutment element 27. The stop elements 32 and 33, the abutment members 26 and 27 and the next successive spring leg 24, and the threading coupling sections 19 and 29 are so related, that when the desired threaded coupling is effected and the stop element 33 is in engagement with the abutment member 27, the stop element 32 is spaced from the abutment member 26 a distance less than that between the abutment member 27 and the next successive spring leg 24.

Considering now the operation of the mounting arrangement described above, in the initial coupling position the stop element 33 engages the abutment member 27. The objective barrel section 29 is screwed into the coupling ring threaded section 19, the coupling ring 16 being held stationary by the retarding spring members 22a, 22b, and 22c. When the desired screw coupling is effected between the barrel 28 and the coupling ring 16 the torque imparted by the rotated barrel 28 to the coupling ring 16 overcomes the retarding force of the spring members, and allows the barrel and coupling ring to rotate as a unit, as shown in FIGURE 2. The rotation of the coupling ring and barrel as a unit is continued until the stop element 32 engages the abutment member 26, as seen in FIGURE 3, to complete the mounting of the objective. The position of the barrel 28 relative to the coupling ring 16 and hence its axial position is constant by reason of the spring loaded frictional engagement between the coupling ring 16 and the camera body member, and the rotational position of the barrel 28 relative to the camera body is constant by reason of the abutment member 26 and stop element 32. In effecting the disengagement of the barrel 28 from the coupling ring, it is merely rotated in an opposite direction, the stop element 33 engaging the abutment member 27 preventing the rotation of the coupling ring 16 attendant to the decoupling rotation of the barrel 28.

In FIGURES 4 and 5 of the drawing there is illustrated another embodiment of the present invention which differs from that first described in the provision of a manipulatable detent which engages the objective barrel upon the precise positioning thereof on the camera body to releasably lock the barrel in position. Specifically, an internally threaded coupling ring 34 is rotatably mounted on the front wall 36 of the camera body and frictionally retarded from rotation under the influence of the circumferentially spaced E-shaped spring members 37 in the manner of the coupling ring 16, body member 10 and spring members 22a, 22b and 22c. One of the spring members 22a is provided with an abutment member 37 which cooperates with a stop element 38 on the objective barrel 39, in the manner of the abutment member 26 and stop element 32, and the coupling ring 34 is provided with a stop element 40 corresponding with stop element 33.

Formed in the trailing peripheral edge of the barrel 39 at the shoulder which delineates the coupling section 41 is a recess or well 42. A latching lever 43 is pivotally mounted intermediate its ends to the forward end of of the forwardly directed post 44 positioned on the body wall 36 along the border of the ring engaging opening therein. The lever 43 includes a leg 46 terminating in a radially inwardly directed finger or detent 47 and an oppositely directed finger piece defining leg 47'. The lever 43 is spring urged counterclockwise, as viewed in FIGURE 4, to resiliently urge the detent 47 into engagement with the barrel peripheral face and into engagement with the well 42 when the barrel is in its properly mounted position. The well 42 is so located and dimensioned as to be engaged by the detent 47 only when the barrel 39 is accurately mounted on the camera both axially and angularly.

The operation of the mounting arrangement last described is similar to that first described except that the barrel 39 is releasably locked in its mounted position against any movement by engagement of the recess 42 by the detent 47. In effecting the insertion of the barrel 39, and the unlocking of the barrel 39 attendant to its decoupling, the lever 43 is swung clockwise against the spring pressure by manipulating the finger piece 47'.

While there have been described and illustrated preferred embodiments of the present invention it is apparent that numerous alterations, omissions, and additions may be made without departing from the spirit thereof.

What is claimed is:

1. A photographic camera, comprising a camera body member, a coupling ring rotatably mounted to said body member and provided with a peripheral thread, means inhibiting the rotation of said coupling ring and releasable at a predetermined torque on said coupling ring, a lens barrel provided with a peripheral thread matably engageable with said coupling ring thread, and releasably engageable indexing means positioned on said body member and lens barrel.

2. The photographic camera of claim 1 wherein said indexing means mounted on said barrel member is axially movable therewith into and out of registry with said indexing means on said body member.

3. The photographic camera of claim 1 wherein one of said indexing means comprises an abutment member mounted on said body member rearwardly of said coupling ring and projecting inwardly of the inner periphery thereof and said other indexing means comprises a stop element mounted on the wall of said barrel and projecting rearwardly thereof.

4. The photographic camera of claim 1 including a stop element mounted on said coupling ring and rotatable therewith and an abutment member on said body member in circumferential registry with said stop element to limit the rotation of said coupling ring.

5. The photographic camera of claim 1 wherein said indexing means includes a recess formed in the outer peripheral face of said barrel and a radially movable detent mounted on said body member and resiliently urged toward engagement with the periphery of said barrel and adapted to engage said recess when said barrel is in full engagement with said coupling ring.

6. The photographic camera of claim 1 wherein said ring rotating inhibiting means comprises an element carried by said body member and spring urged into frictional engagement with a surface of said coupling ring.

7. The photographic camera of claim 1 wherein said coupling ring is internally threaded and said barrel is externally threaded, said ring rotation inhibiting means comprises a plurality of circumferentially spaced spring fingers mounted on said body member and engaging a rearwardly directed surface of said coupling ring, and said indexing means comprises a rearwardly directed stop element mounted on said barrel and radially inwardly projecting abutment mounted on said body member.

8. The photographic camera of claim 1 wherein said coupling ring is internally threaded and said barrel is externally threaded, said ring rotation inhibiting means comprises a plurality of circumferentially spaced spring fingers mounted on said body member and engaging a rearwardly directed surface of said coupling ring, and said indexing means comprises a recess formed in the outer peripheral surface of said barrel and a pivoted lever mounted on said body member and terminating in a radially inwardly directed finger spring urged with said lever toward engagement with the periphery of said barrel and adapted to engage said recess.

9. The photographic camera of claim 1 wherein said predetermined torque exceeds that required for effecting a screw coupling between said barrel and said coupling ring.

References Cited

UNITED STATES PATENTS

| | | | |
|---|---|---|---|
| 2,110,477 | 3/1938 | Wittel | 95—11 |
| 2,461,357 | 2/1949 | Broido et al. | 95—11 |
| 2,756,633 | 7/1956 | Brandes et al. | 95—11 |

NORTON ANSHER, *Primary Examiner.*

C. E. SMITH, *Assistant Examiner.*